United States Patent [19]

Steeves, Jr.

[11] Patent Number: 4,464,706

[45] Date of Patent: Aug. 7, 1984

[54] LAMP HEAD BRACKET MOUNT FOR GENERATOR

[75] Inventor: John K. Steeves, Jr., Rochester, N.Y.

[73] Assignee: Tele-Lite, Inc., Rochester, N.Y.

[21] Appl. No.: 402,964

[22] Filed: Jul. 29, 1982

[51] Int. Cl.³ .............. B62J 5/08

[52] U.S. Cl. .............. 362/193; 362/192; 362/371; 362/199; 362/376; 362/269; 362/427; 362/285

[58] Field of Search .............. 362/199, 269, 322, 371, 362/427, 192, 285, 376

[56] References Cited

U.S. PATENT DOCUMENTS

| | | | |
|---|---|---|---|
| 3,231,730 | 1/1966 | Wagner | 362/269 X |
| 3,479,499 | 11/1969 | Dahl | 362/199 X |
| 3,875,396 | 4/1975 | Webb | 362/99 |
| 4,234,908 | 11/1980 | McGee | 362/427 X |
| 4,364,104 | 12/1982 | Holahan et al. | 362/372 X |
| 4,388,712 | 6/1983 | Timm | 369/12 X |

*Primary Examiner*—Peter A. Nelson

*Attorney, Agent, or Firm*—Stonebraker, Shepard & Stephens

[57] ABSTRACT

A bracket mount fits directly over one end of a rectangular housing 17 of a portable engine-driven electric generator 15 and supports a flood lamp 10 powered by generator 15. A bracket 20 includes a frame extending around the end of generator housing 17 and projections 21 that reach back to mounting locations where bracket 20 is screwed to generator 15. A gooseneck 30 secured to an upper region of bracket 20 curves downward and outward in a gooseneck shape and terminates in a knuckle that supports lamp head 10 for vertical pivotal movement. Lamp head 10 can be folded under gooseneck 30 so that the front face of the lamp is close against bracket 20 and the end of generator housing 17 for protective storage, and lamp head 10 can be pivoted to upwardly aimed positions accommodated by the curvature of the upper side of gooseneck 30. Gooseneck 30 is hollow and provides a conduit 40 for electric conductors leading from the generator to the lamp head.

10 Claims, 5 Drawing Figures

LAMP HEAD BRACKET MOUNT FOR GENERATOR

BACKGROUND

Many situations call for a portable, generator-driven flood lamp. These include accidents, fires, rescues, utility repairs, construction, and various night work out of reach of conventional electric power.

To meet this need, I have selected a portable engine-driven generator that is compact and light enough to be carried about with a carrying handle, and I have devised a bracket for mounting a flood lamp head directly to the housing of this generator. My bracket mount allows the lamp head to pivot from a protectively stored position to an upwardly aimed position for easily directing light wherever it is needed. My bracket mount is also sturdy, reliable, rugged, and compact to combine a flood lamp head with a portable generator in a way that is practical, effective, and able to withstand the rigors of rough use.

SUMMARY OF THE INVENTION

My bracket mount fits directly over one end of a rectangular housing for an engine-driven electric generator and supports a flood lamp powered by the generator. The bracket includes a frame extending around the perimeter of the end of the generator housing, and projections that reach back to mounting locations where the bracket is screwed to the generator housing. A gooseneck secured to an upper region of the bracket curves downward and outward in a gooseneck shape terminating in a knuckle that supports the lamp head for vertical pivotal movement. The lamp head can be folded under the gooseneck so that the front face of the lamp head is close against the bracket and the end of the generator housing for a protective storage, and the lamp head can be pivoted to upwardly aimed positions accommodated by the curvature of the upper side of the gooseneck. The gooseneck is hollow and provides a conduit for electric conductors. The overall combination is rugged, durable, and compact; and it makes the generator usable as a portable and powerful flood lamp.

DRAWINGS

DETAILED DESCRIPTION

Figure 1:
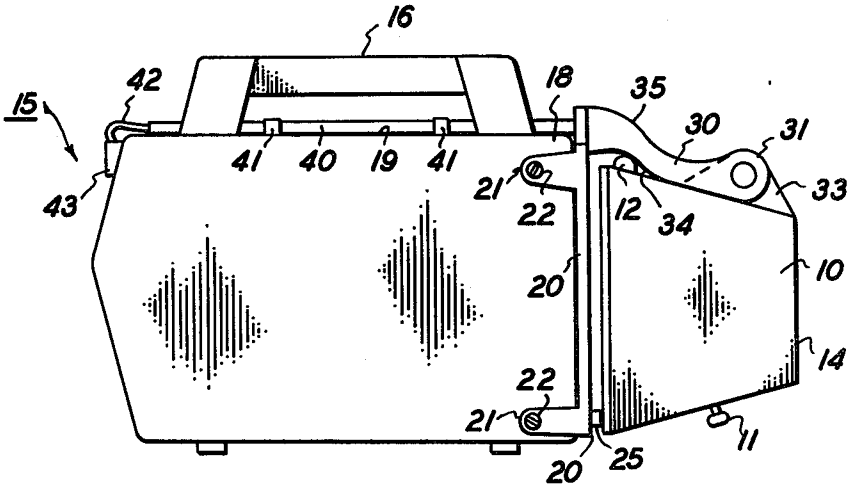
FIG. 1 is a partially schematic, side elevational view of a preferred embodiment of my bracket mount for a lamp head combined with an engine-driven generator and shown with the lamp head folded for protective storage.

My bracket mount combines a flood lamp head 10 with a portable, engine-driven generator 15. Generator 15 is light enough to be carried by handle 16 and has a generally rectangular housing 17 that compactly contains an engine, fuel supply, and electric generator. Electricity can be produced by generator 15 wherever it can be carried and operated, and my bracket mount supports an electric flood lamp 10 directly on generator 15 for converting electricity to a powerful light source.

The main components of my bracket mount are a frame-shaped bracket 20 and a gooseneck 30. These are strong and rugged and securely attached to generator 15 to support lamp head 10 in a way that is compact, convenient, and readily operable. Since the portable light source provided by my bracket mount may be used at fires, rescues, construction sites, and other places where it may get wet and receive hard use, it is made both strong and water resistant. It is also made compact and effective both at protecting lamp head 10 in a folded position for storage and allowing lamp head 10 to pivot to an upwardly aimed position so that light can be directed anywhere it is desired.

The components of generator 15 are compactly arranged within its generally rectangular housing 17 so that it can be carried about with handle 16. I mount bracket 20 over the air intake end 18 of generator 15 where it does not interfere with controls and is not in the path of exhaust. Bracket 20 is shaped like a frame that extends around the perimeter of air intake end 18 of generator 15. This lets bracket 20 fit closely and compactly against generator housing 17 and also does not interfere with air intake while generator 15 operates.

To insure that bracket 20 is ruggedly and securely attached to generator 15, I have provided four rearward projections 21 that reach horizontally back from the frame portion of bracket 20 and are screwed to side regions of housing 17 near air intake end 18. In doing this, I have used existing threaded holes for screwing on exterior panels of generator housing 17, and I have screwed projections 21 to these mounts with similar screws 22. I have also provided corner gussets 23 that brace and strengthen projections 21 relative to bracket frame 20.

I prefer a pair of stop pads 25 mounted on a lower region of bracket frame 20 to engage lamp head 10 in a folded position; and since the air intake end of generator housing 17 has a pair of screw mounts in this region, I have screwed stop pads 25 in place with screws 24 that enter preexisting threaded holes in generator end 18. Screws 24 not only hold stop pads 25 in place, but also strengthen the mounting of bracket 20 to generator 15.

Bracket 20 is shaped to extend to a little way above the top 19 of generator housing 17. The upper region of bracket 20 supports gooseneck 30 and also receives a conduit 40 for guiding electric conductors into gooseneck 30. Conduit 40 is preferably formed as a metal tube held securely to top 19 of generator housing 17 by clamps 41 so that conduit tube 40 extends alongside carrying handle 16. An electric conductor cord 42 extends from a plug 43 fitting into a receptacle outlet for generator 15 and runs through conduit tube 40 to the upper region of bracket 20. There conduit 40 extends into a receiving hole 44 where it is held in place by a set screw 45. Gooseneck 30 is hollow so that conductor 42 can run through gooseneck 30 to lamp head 10.

Gooseneck 30 is preferably screwed to the upper region of bracket 20 with four screws 32. The joint between gooseneck 30 and bracket 20 is also preferably sealed with a sealant material. Gooseneck 30 is shaped to accommodate the desired movement of lamp head 10, and the free end of gooseneck 30 also forms a part 31 of a knuckle on which lamp head 10 pivots. The other part 33 of the pivot knuckle is formed on lamp head 10, and the two knuckle parts 31 and 33 form a horizontal knuckle axis so that lamp head 10 pivots vertically. A friction device such as a pair of nylon washers are arranged between knuckle parts 31 and 33 to hold lamp head 10 in any position within its range, and the strength of the frictional grip is preferably adjustable as is generally known.

Lamp head 10 has a handle 11 by which it can be pivotally adjusted. Gripping handle 11 and raising it in an upwardly directed arc moves lamp head 10 from the folded position of FIG. 1 to the upwardly aimed position of FIG. 2. Handle 11 can also be used for positioning lamp head 10 in any intermediate position. Because of the friction grip between knuckle parts 31 and 33, pivotal movement of lamp head 10 stresses gooseneck 30 and bracket 20 so that their interconnection and mounting on generator 15 are preferably made strong and secure to withstand this.

The underside 34 of gooseneck 30 curves downward as it extends away from bracket 20 to provide clearance for lamp head 10 in the folded position of FIG. 1. This allows lamp head 10 to fold against stops 25 on bracket 20 so that the front face of lamp head 10 is closely spaced from bracket 20 and the end 18 of generator 15 where it is protected for storage. In this folded position, a closure clip 12 for lamp head 10 just clears the downwardly curving underside 34 of gooseneck 30. Also, in the folded position of FIG. 1, the back 14 of lamp head 10 extends outward beyond knuckle parts 31 and 33 to protect the knuckle from damage during storage. By compactly folding lamp head 10 against the air intake end 18 of generator 15, the overall length of the generator and folded lamp head is short enough to fit in standard size lockers in fire and emergency trucks.

Figure 2:
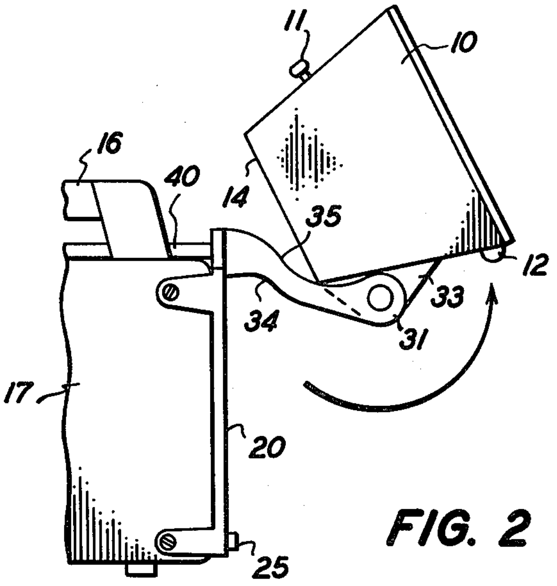
FIG. 2 is a fragmentary side elevational view similar to the view of FIG. 1 and showing the lamp head in an upwardly aimed position.
Figure 4:
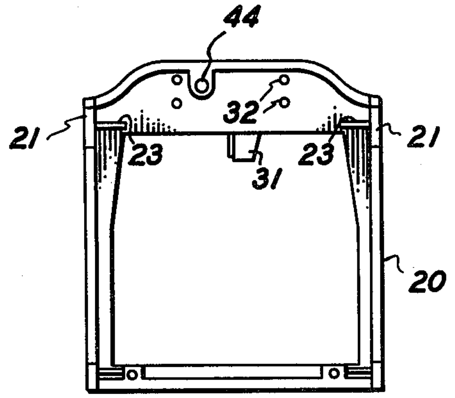
FIG. 4 is a rear elevational view of the bracket mount of FIGS. 1–3 removed from the generator and with the lamp removed.
Figure 3:
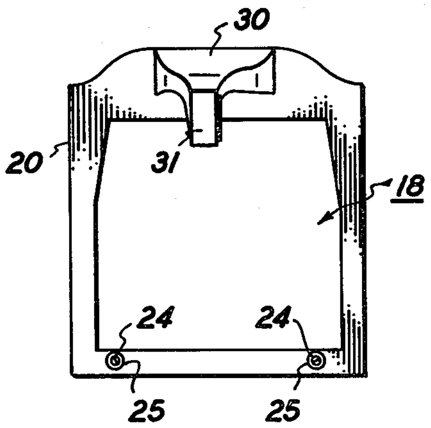
FIG. 3 is a front elevation of the generator and bracket mount of FIG. 1 with the lamp head removed.
Figure 5:
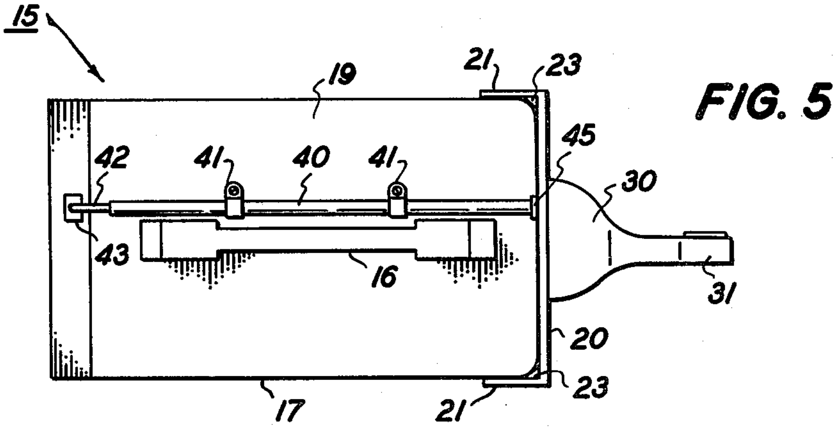
FIG. 5 is a plan view of the generator and bracket mount of FIG. 1 with the lamp head removed.

The upper side 35 of gooseneck 30 also curves downward from bracket 20 as it extends outward until it approaches knuckle part 31 that it curves upward to form. This leaves a gooseneck or valley in upper surface 35 that accommodates the back 14 of lamp head 10 when pivoted to an upwardly aimed position as shown in FIG. 2. The curved shapes of upper surface 35 and lower surface 34 of gooseneck 30 thus allow it to extend through a space that fits closely over lamp head 10 in the folded position of FIG. 1 and closely under lamp head 10 in the upwardly aimed position of FIG. 2. The shape of gooseneck 30 then allows full pivotal functioning of lamp head 10 between folded storage and upwardly aimed lighting and also contributes to strength and reliability in supporting lamp head 10.

With gooseneck 30 hollow and firmly joined and sealed to bracket 20, the interior of gooseneck 30 is water resistant to keep conductors dry as they pass through gooseneck 30 and knuckle parts 31 and 33 to lamp head 10. This makes the unit resistant to damage from water that can wet it during fire fighting.

I claim:

1. A lamp head bracket mount for mounting a lamp head with a front face and a back on an engine-driven electric generator with a generally rectangular housing, one end of which is generally rectangular, said lamp head and bracket mount, when assembled together and attached to said generator housing, comprising:

a. a bracket that fits closely over said one end of said generator housing;

b. said bracket being vertically oriented and having a frame portion that extends around the perimeter of said end of said generator housing;

c. said bracket having projections that reach horizontally back from said frame portion and are screwed to side regions of said housing near said end of said housing;

d. a non-flexible gooseneck secured to an upper region of said bracket at an upper region of said end of said generator;

e. said gooseneck curving downward in a gooseneck shape as it extends outward from said upper region of said bracket;

f. a free end of said gooseneck forming one part of a supporting knuckle for said lamp head;

g. another part of said supporting knuckle being formed on said lamp head so that said lamp head pivots on a vertical axis through said knuckle;

h. said lamp head being movable between an upwardly aimed position and a folded position in which said front face of said lamp head is folded closely against said bracket and said end of said generator housing for protective storage;

i. a lower region of said bracket having stops limiting said folded position of said front face of said lamp head against said bracket;

j. an underside of said gooseneck sloping downward away from said bracket to provide clearance for said lamp head in said folded position against said bracket closely underneath said gooseneck;

k. an upperside of said gooseneck curving downward from said bracket and upward to said knuckle to provide clearance for tilting said lamp head into said upwardly aimed position; and l. said gooseneck being hollow and providing a conduit for electric conductors entering said upper region of said bracket and extending through said gooseneck and said knuckle to said lamp head.

2. The mount of claim 1 including a conduit for leading conductors along a top of said generator housing and into said upper region of said bracket in the region of said gooseneck.

3. The mount of claim 1 wherein four of said projections reach back from said frame portion and are screwed to side regions of said housing.

4. The mount of claim 1 wherein said stops for said folded lamp head are a pair of stop pads screwed to said bracket and said end of said generator housing.

5. The mount of claim 1 wherein said end of said generator housing supporting said bracket is an air intake end of said housing.

6. The mount of claim 1 wherein said back of said lamp head extends beyond said knuckle when said front face of said lamp head is folded against said bracket in a storage position.

7. The mount of claim 6 including a conduit for leading conductors along a top of said generator housing and into said upper region of said bracket in the region of said gooseneck.

8. The mount of claim 7 wherein said stops for said folded lamp head are a pair of stop pads screwed to said bracket and said end of said generator housing.

9. The mount of claim 8 wherein four of said projections reach back from said frame portion and are screwed to side regions of said housing.

10. The mount of claim 9 wherein said end of said generator housing supporting said bracket is an air intake end of said housing.

* * * * *